(12) United States Patent  (10) Patent No.: US 7,483,109 B2
Ishibashi  (45) Date of Patent: Jan. 27, 2009

(54) SPACE SAVING ON PERIPHERAL RIM OUTSIDE DISPLAY PIXEL REGION IN DISPLAY DEVICE

(75) Inventor: Osamu Ishibashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 11/102,777

(22) Filed: Apr. 11, 2005

(65) Prior Publication Data
US 2005/0225544 A1  Oct. 13, 2005

(30) Foreign Application Priority Data
Apr. 12, 2004 (JP) ............................. 2004-117034

(51) Int. Cl.
G02F 1/1345 (2006.01)
G02F 1/1333 (2006.01)
G09G 3/30 (2006.01)
(52) U.S. Cl. .......................... 349/149; 349/158; 345/80
(58) Field of Classification Search ................ 349/149, 349/150, 151, 152, 158; 345/80, 90
See application file for complete search history.

(56) References Cited

U.S. PATENT DOCUMENTS

| 5,657,139 | A | * | 8/1997 | Hayashi | ........................ 349/40 |
| 5,737,272 | A | * | 4/1998 | Uchiyama et al. | ........... 345/206 |
| 5,883,465 | A | * | 3/1999 | Inoguchi et al. | .............. 313/509 |
| 6,005,652 | A | * | 12/1999 | Matsuhira | .................... 349/149 |
| 6,175,397 | B1 | * | 1/2001 | Inoue et al. | .................... 349/86 |
| 2003/0103017 | A1 | * | 6/2003 | Kawase | ........................ 345/30 |

FOREIGN PATENT DOCUMENTS

| CN | 1153913 A | 7/1997 |
| CN | 1394293 A | 1/2003 |
| JP | 3033124 | 1/1992 |
| JP | 06-342164 | 12/1994 |
| JP | 11-352516 | 12/1999 |
| JP | 3361993 | 1/2000 |
| JP | 2000-111952 | 4/2000 |
| JP | 2000-241827 | 9/2000 |
| JP | 2001-066579 | 3/2001 |
| JP | 2002-040483 | 2/2002 |
| JP | 2002-131772 | 5/2002 |
| JP | 2004-046115 | 2/2004 |

* cited by examiner

Primary Examiner—Mike Qi
(74) Attorney, Agent, or Firm—Sughrue Mion, PLLC (57) ABSTRACT

The display device of the present invention has a scan line driver element formed on a dielectric substrate and provided with a scan line driver circuit made up of thin film transistors. The scan line driver element is mounted on the region along one side of the display panel outside the display pixel region. Further, signal line driver element provided with a signal line driver circuit made up of mono crystal silicon transistors are mounted on the region along another side adjoining the one side of the display panel outside the display pixel region.

6 Claims, 7 Drawing Sheets

SPACE SAVING ON PERIPHERAL RIM OUTSIDE DISPLAY PIXEL REGION IN DISPLAY DEVICE

BACKGROUND OF THE INVENTION

1. Field of the Invention

The present invention relates to technology to achieve space-saving on a peripheral rim outside the display pixel region of a display device, for example, a liquid crystal display device, an EL (Electronic Luminescent) display device, and the like.

2. Description of the Related Art

There are liquid crystal display devices having a display panel with a liquid crystal film sandwich-sealed between two glass substrates. Display devices with this type of liquid crystal display device have recently come into practical use in which driver elements are mounted on the peripheral rim of the display panel, wherein the peripheral rim refers to the peripheral region outside the display pixel area in one of the two glass substrates that are opposite to each other and moreover outside the coverage area of another of the two glass substrates.

Figure 1:
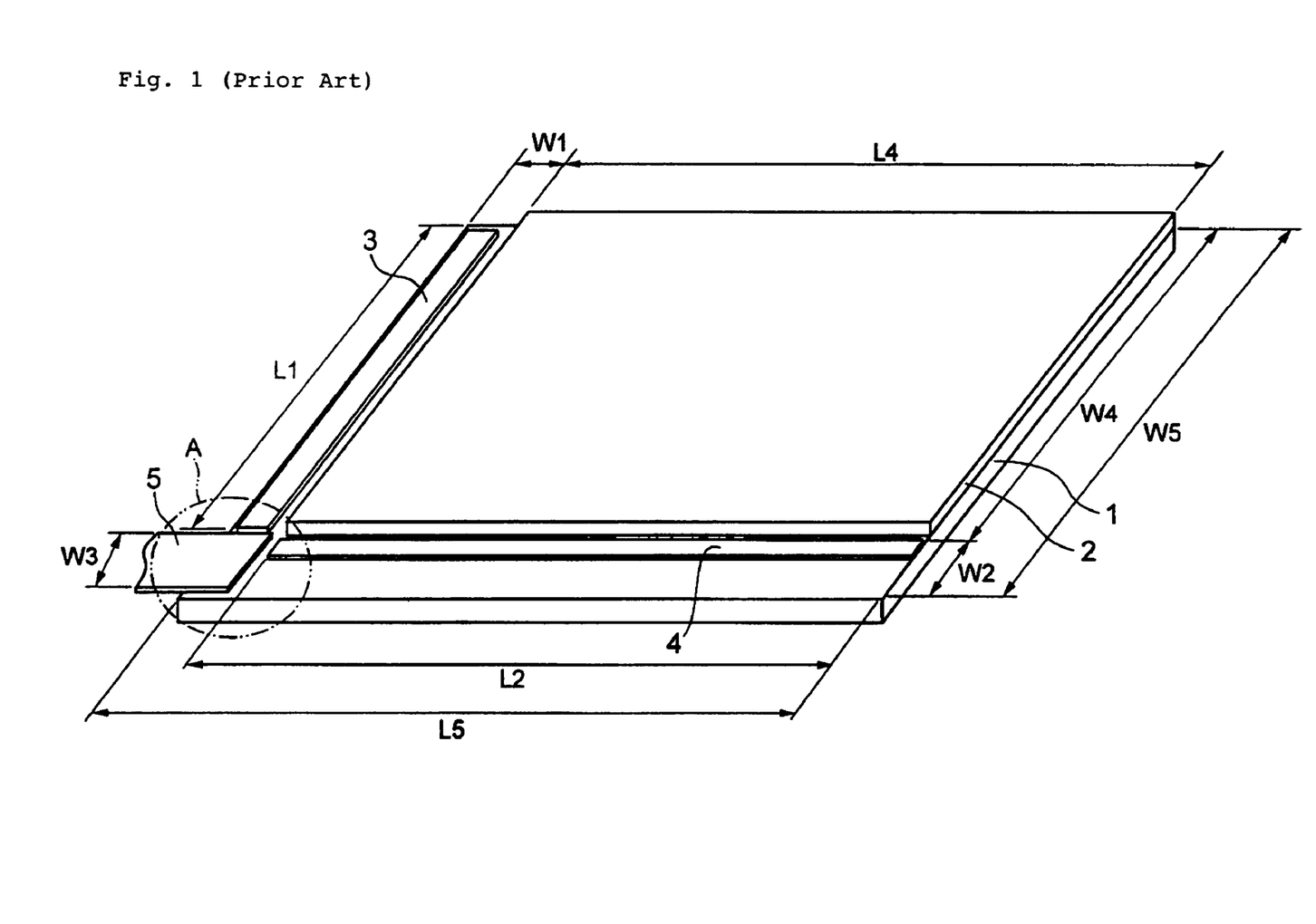
FIG. 1 is a perspective view illustrating the structure of a conventional liquid crystal display device.
Figure 2:
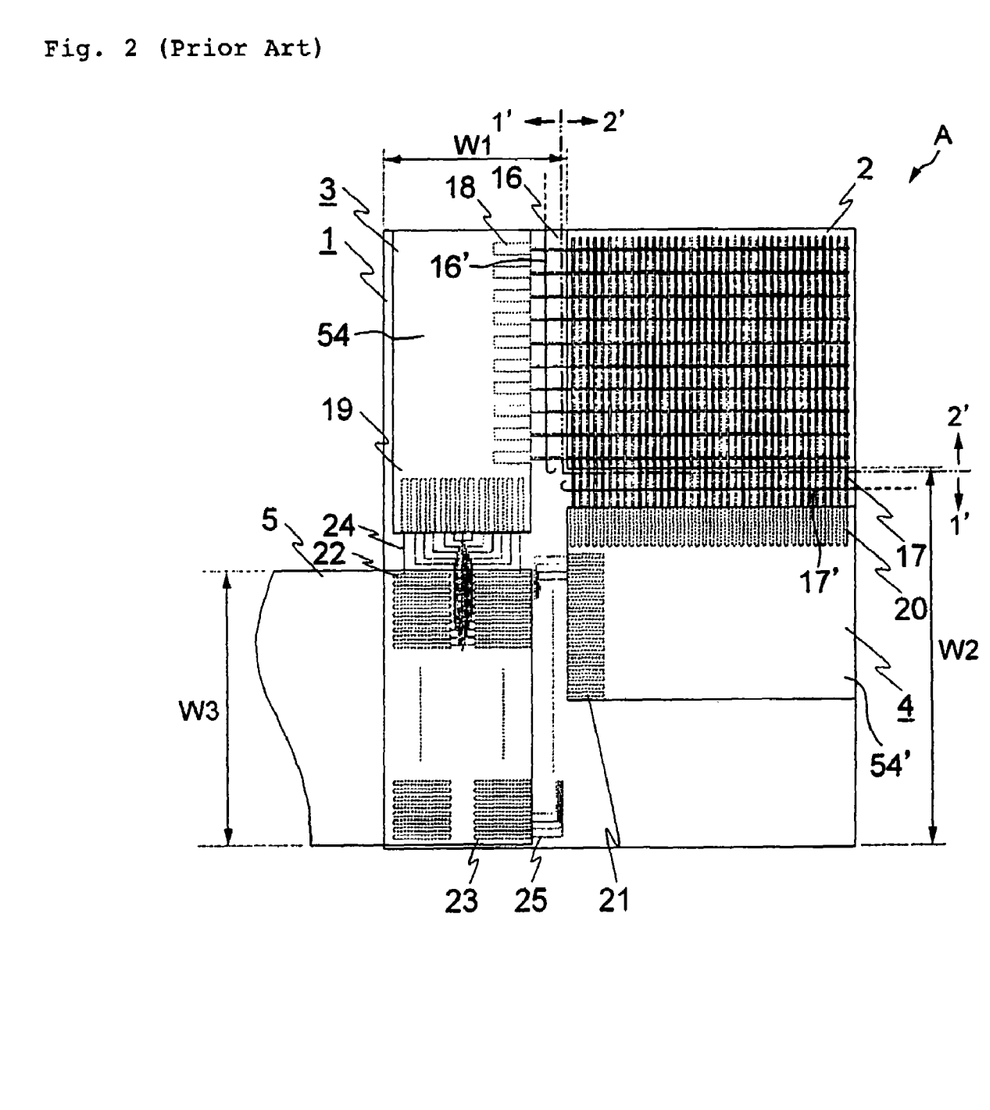
FIG. 2 is a plain view of part A in FIG. 1.

The liquid crystal display device described in JP 3033124, for example, is mounted with a scan line driver element and a signal line driver element in the peripheral rim of the display panel. The scan line driver element has a scan line driver circuit, which is formed on a glass substrate and constituted of thin film transistors. The signal line driver element has a signal line driver circuit, which is formed on a glass substrate and constituted of thin film transistors. FIG. 1 is a perspective view illustrating a configuration of this type of a liquid crystal display device. FIG. 2 is a plain view of part A in FIG. 1. Explanation is next presented regarding the conventional liquid crystal display device based on FIG. 1 and FIG. 2.

This conventional liquid crystal display device is provided with glass substrate 1, glass substrate 2, scan line driver element 3, signal line driver element 4 and FPC (flexible printed circuit) cable 5.

Glass substrate 1 is a quadrangular glass substrate. This glass substrate 1 has: quadrangular display pixel region 2', which is made up of a plurality of display pixels arrayed in a matrix individually selected by a plurality of scan lines 16 and a plurality of signal lines 17; peripheral rim 1' that remains which is the area exclusive of display pixel region 2'; scan line electrode column 16' made up of the ends of a plurality of scan lines 16 provided on one side of display pixel region 2'; and signal line electrode column 17' made up of the ends of a plurality of signal lines 17 provided on another side of display pixel region 2' adjoining the side on which scan line electrode column 16' is provided.

Glass substrate 2 is a quadrangular glass substrate arranged in the position opposite to glass substrate 1 across the liquid crystal layer (not shown) to serve for display pixel region 2'.

Scan line driver element 3 is structured to have a scan line driver circuit (not shown) formed on quadrangular glass substrate 54 to supply a voltage to scan lines 16.

Signal line driver element 4 is structured to have a signal line driver circuit (not shown) formed on quadrangular glass substrate 54' to supply a voltage to signal lines 17.

FPC cable 5 is a quadrangular cable adapted to connect the present liquid crystal display device and an external circuit. FPC cable 5 transfers the signals such as control signals, a clock signal, etc. and power supply voltages to scan line driver element 3 and signal line driver element 4 from the external circuit.

The conventional liquid crystal display device can be explained as described below by defining the long side of a quadrangle as a length and the short side as a width.

Peripheral rim 1' includes a peripheral rim along scan line electrode column 16' and a peripheral rim along signal line electrode column 17'. The width W3 of FPC cable 5 is wider than the width W1 of peripheral rim 1' along scan line electrode column 16' and narrower than the width W2 of the peripheral rim along signal line electrode column 17'. Signal line driver element 4 is mounted on the peripheral rim along signal line electrode column 17'. Scan line driver element 3 and FPC cable 5 are mounted on the peripheral rim along scan line electrode column 16'. The length of scan line driver element 3 and the width of FPC cable 5 are in the same direction as the length of scan line electrode column 16'. The width W5 of glass substrate 1 substantially equals the sum of the length L1 of scan line driver element 3 (nearly equal to the length of scan line electrode column 16') and the width W3 of FPC cable 5.

More detailed explanation is hereinbelow given regarding the conventional liquid crystal display device.

The display panel of this conventional liquid crystal display device is configured to have glass substrate 1 and glass substrate 2 in opposite positions across a liquid crystal layer.

On the surface of glass substrate 1, there are formed a plurality of thin film transistors (not shown) for applying a voltage to the display pixel electrodes, a plurality of scan lines 16 each for electrically selecting one of the columns of a plurality of the thin film transistors, and a plurality of signal lines 17 orthogonally intersected with scan lines 16 and each for electrically selecting one of the columns of a plurality of the thin film transistors. On the surface of glass substrate 2, there are formed the electrodes (not shown) opposite to the display pixel electrodes.

On one side of glass substrate 1, there is provided scan line electrode column 16', in which a plurality of scan line electrodes are aligned. On another side adjoining the side on which scan line electrode column 16' is provided, there is provided signal line electrode column 17', in which a plurality of signal line electrodes are aligned.

Scan line driver element 3 is mounted on peripheral rim 1' on the side of glass substrate 1 on which scan line electrode column 16' is provided. In scan line driver element 3, output terminals 18 of the scan line driver circuit are aligned to connect to each of the corresponding scan line electrodes of scan line electrode column 16' on glass substrate 1. Likewise, signal line driver element 4 is mounted on peripheral rim 1' on the side of glass substrate 1 on which signal line electrode column 17' is provided. In signal line driver element 4, output terminals 20 of the signal line driver circuit are aligned to connect to each of the corresponding signal line electrodes of signal line electrode column 17' on glass substrate 1.

On the edge of one end of glass substrate 54 of scan line driver element 3, there are formed input terminals 19, and likewise, on the edge of one end of glass substrate 54' of signal line driver element 4, there are formed input terminals 21. These input terminals 19, 21 are connected to FPC cable 5 in a corner of glass substrate 1 by means of solder etc. Further, in the corner of glass substrate 1, there are aligned connection terminals 22, 23 to be electrically connected to FPC cable 5.

A problem encountered in this conventional liquid crystal display device, however, has been that it is impossible to shorten the size of the width of the peripheral rim where the signal line driver element is mounted. This problem originates from the size of the width of the signal line driver element. The reason for this is as described below.

With the recent development of new techniques, the width of a scan line driver element has been narrowed to not greater than 4 mm, but a signal line driver element requires from ten to several hundred times the number of transistors that are needed for the scan line driver element in.

In addition, the two-system power supply wiring and GND wiring are required for the power supply conductor to be wired within the signal line driver element. Now, it is assumed that the two-system power supply wiring and GND wiring are wired within a 30 cm long signal line driver element. For example, if it is presumed that the wiring in each system of the two-system power supply is a 1 mm thick copper wiring through which 50 mA electric current flows, then, it is necessary to set the wiring width of each power supply wiring to 2.5 mm or greater in order to limit the voltage drop across the power supply wirings in the signal line driver element to 0.1 V or lower, allowing for a specific resistance of a copper wire of $1.7 \times 10^{-8}$ $\Omega$m. Further, if it is presumed that current of 100 mA flows through the GND wiring, which is a copper wiring of 1 mm in thickness through which 100 mA electric current flows, then, it is necessary to set the wiring width of the GND wiring to 5 mm or wider in order to limit the voltage drop across the GND wiring in the signal line driver element to 0.1 V or lower.

For this reason, only the wiring widths of the power supply wirings in the signal line driver element attain 10 mm or wider (each of the widths of the power supply wirings of the two systems being 2.5 mm and the width of GND line being 5 mm). As a result, it is impossible as a matter of course to have the signal line driver element 4 mm wide or less as with the scan line driver element.

Consequently, it is necessary to increase the size of the width of the peripheral rim to mount the signal line driver element, because the width of the signal line driver element attains 10 mm or wider.

SUMMARY OF THE INVENTION

It is an object of the present invention to provide a display device which saves space on the peripheral rim where the signal line driver element in a display panel is mounted.

The display device of the present invention is provided with a display panel, a scan line driver element, signal line driver elements and FPC cable, etc.

The display panel is a quadrangular display panel having a plurality of display pixels arrayed in a matrix, and a plurality of scan lines and a plurality of signal lines each adapted to select a plurality of the display pixels.

The scan line driver element has a scan line driver circuit formed on a dielectric substrate and made up of thin film transistors and adapted to receive signals and a power supply voltage from an external circuit and supply the power supply voltage to the scan lines in response to the supplied signals, wherein the scan line driver element is mounted outside the display pixel region in a peripheral rim along one side of said display panel. For reference, the dielectric substrate is, for example, a glass substrate.

The signal line driver element has a signal line driver circuit made up of mono crystal silicon transistors and adapted to receive signals and a power supply voltage from the external circuit and supply said power supply voltage to the signal lines in response to the supplied signals, wherein said signal line driver element is aligned in the peripheral rim along another side adjoining said one side of said display panel outside the display pixel region in an arrangement in which each of said signal line driver elements is mounted on a film substrate.

FPC cable has wirings formed to supply the signals and power supply voltages from the external circuit to the scan line driver element and display panel and adapted to supply the signals and the power supply voltages to the scan line driver element and the display panel through said wirings.

The display device of the present invention can be configured as described below. The film substrate has wirings formed to supply the signals and power supply voltages from the external circuit to the scan line driver element and the display panel, and the wirings of the film substrate supply the signals and power supply voltages to the scan line driver element and the display panel through the wirings formed on the film substrate in place of the FPC cable.

The display device of the present invention can be configured as described below. The signal line driver elements are mounted directly on the peripheral rim along another side of the display panel outside the display pixel region without interposing the film substrate, and the FPC cable additionally has the wirings formed to supply signals and a power supply voltage from an external circuit to the signal line driver elements and supplies the signals and power supply voltage to the signal line driver elements through the additionally formed wirings. In addition, the FPC cable can be provided in the corner region bounded by the scan line driver element and the signal line driver element.

A display device according to the present invention can have a configuration of a liquid crystal display device described below. The display panel is provided with a quadrangular first glass substrate on which the display pixels, the scan lines and the signal lines are formed and a quadrangular second glass substrate opposite the first glass substrate across the liquid crystal layer and having opposed electrodes formed thereon. The first glass substrate is larger in both length and width than the second glass substrate, with an area covered with the second glass substrate, serving as the display pixel region and an area outside the area covered with the second glass substrate, defined as the peripheral rim.

In other words, the display device of the present invention has a scan line driver element, which is formed on a glass substrate and provided with a scan line driver circuit made up of thin film transistors, and is adapted to mount the scan line driver element on the peripheral rim of the glass substrate of the display panel by means of the GOG (glass on glass) mounting process. The display device of the present invention further has a plurality of signal line driver elements each configured to be a TCP (Tape Carrier Package) provided with a signal line driver circuit formed on a silicon substrate and made up of mono crystal silicon transistors. The display device is adapted to mount the signal line driver elements on the peripheral rim of the glass substrate of the display panel through adhesion using an anisotropic conductive adhesive. Here, TCP means a package having a semiconductor chip mounted on a flexible tape by means of the TAB (Tape Automated Bonding) process, wherein the flexible tape has a pattern on the surface made by means of the photolithography method. Alternatively, the plurality of the signal line driver elements are mounted on the peripheral rim of the glass substrate of the display panel by means of the COG (Chip On Grass) mounting process. Furthermore, an FPC cable for connecting to an external circuit is mounted on the peripheral rim of the glass substrate of the display panel by using anisotropic conductive adhesive.

As described above, the present invention is directed to mounting signal line driver element, having a signal line driver circuit made up of mono crystal silicon transistors mounted on a silicon substrate, on the peripheral rim of the display panel outside the display pixel region.

Accordingly, the width of the peripheral rim on which signal line driver elements are mounted can be made narrower than in the case of prior art in which a signal line driver element provided with a signal line driver circuit made up of thin film transistors on a glass substrate is mounted on the peripheral rim of the display panel.

In other words, according to the present invention, the scan line driver element, which has a scan line driver circuit made up of thin film transistors on a glass substrate, is mounted on the peripheral rim of the display panel by means of the GOG mounting process. Further, a plurality of signal line driver elements, each of which has a signal line driver circuit made up of mono crystal silicon transistors on a silicon substrate, and an FPC cable are mounted on a peripheral rim of the display panel.

As a result, an FPC cable can be mounted on the peripheral rim along one side of the display panel and also it become feasible to achieve space-saving on the peripheral rim of another side of the display panel where the signal line driver elements and an FPC cable are mounted.

The above and other objects, features, and advantages of the present invention will become apparent from the following description with reference to the accompanying drawings which illustrate examples of the present invention.

DESCRIPTION OF THE PREFERRED EMBODIMENTS

The liquid display device explained below is one example of a display device of the present invention.

First Embodiment

Figure 3:
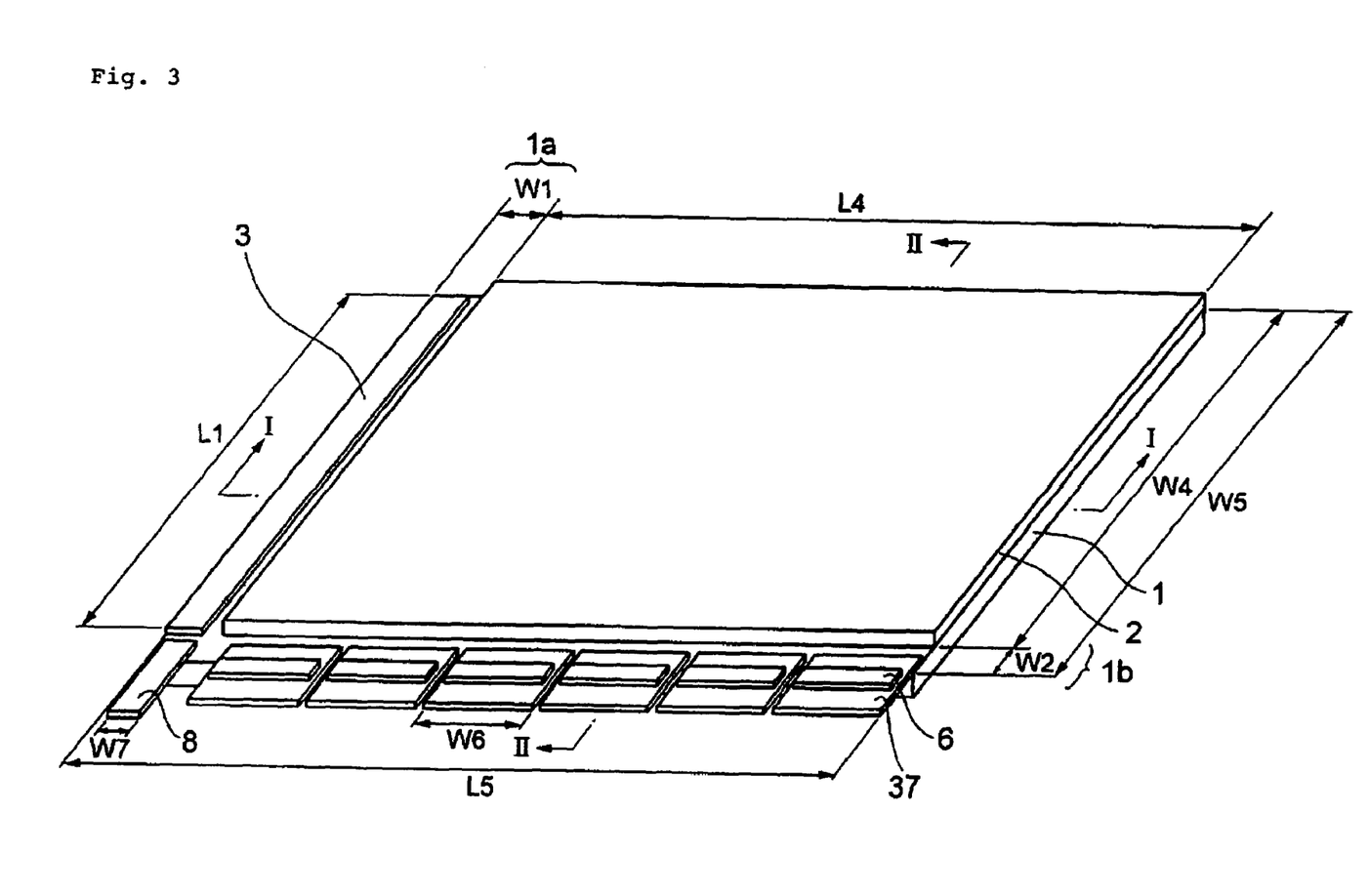
FIG. 3 is a perspective view illustrating the structure of the liquid crystal display device of the first embodiment according to the present invention.
Figure 4A:
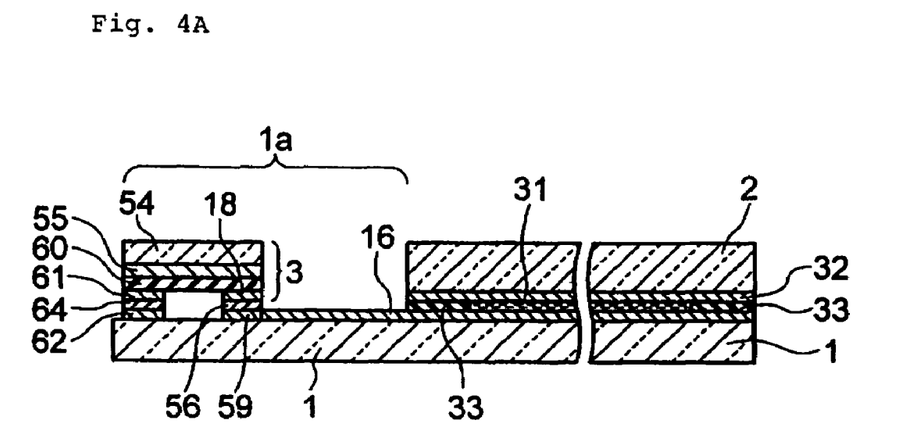
FIG. 4A is a cross-sectional view along the I-I line in FIG. 3.
Figure 4B:
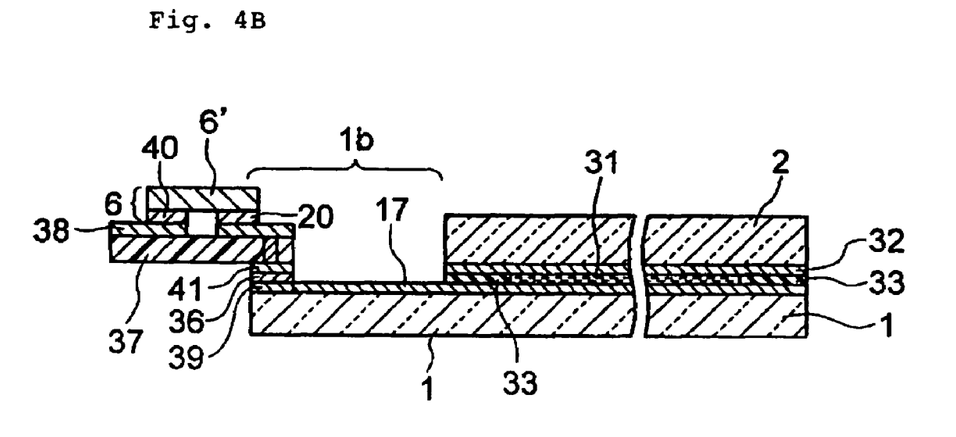
FIG. 4B is a cross-sectional view along the II-II line in FIG. 3.

FIG. 3 is a perspective view illustrating the structure of the liquid crystal display device of the first embodiment according to the present invention. FIG. 4A is a cross-sectional view taken along the I-I line in FIG. 3. FIG. 4B is a cross-sectional view taken along the II-II line in FIG. 3. For reference, in FIG. 3, FIG. 4A and FIG. 4B, constituent elements that are identical to constituent elements in FIG. 1 and FIG. 2 are assigned the same reference numerals.

On the surface of glass substrate 1, there are formed a plurality of thin film transistor (not shown) for applying a voltage to display pixel electrodes (not shown), a plurality of scan lines 16 each for selecting a plurality of thin film transistors, and a plurality of signal lines 17 that orthogonally intersect with the scan lines 16 and are each adapted to select a plurality of thin film transistors.

On the surface of glass substrate 2, there are formed opposed electrodes 32 that are in opposite positions to the display pixel electrodes. Further, glass substrate 1 and glass substrate 2 are bonded together to seal liquid crystal 31.

Along one side of glass substrate 1, there is provided scan line electrode column 59 in which a plurality of scan line electrodes are aligned. Along another side of glass substrate 1 adjoining the side on which scan line electrode column 59 is provided, there is provided signal line electrode column 39 in which a plurality of signal line electrodes are aligned.

Scan line driver element 3 includes: scan line driver circuit 55 adapted for supplying a power supply voltage to each scan line 16 based on signals such as a control signal, a clock signal, etc., when receiving signals and a power supply voltage from an external circuit; output terminal column 18 in which a plurality of the output terminals of scan line driver circuit 55 are aligned; and an input terminal column (not shown) in which a plurality of the input terminals of scan line driver circuit 55 are aligned. Specifically, scan line driver circuit 55 is formed on glass substrate 54, dielectric layer 60 is formed on scan line driver circuit 55 and output terminal column 18, which is connected to scan line driver circuit 55 penetrating through a part of dielectric layer 60, is formed on dielectric layer 60.

Glass substrate 54 has a length nearly equal to the length of scan line electrode column 59 and is 4 mm or smaller in width.

Scan line driver circuit 55 is formed on glass substrate 54 and made up of polysilicon thin film transistors, and when receiving signals such as a control signal, a clock signal, etc. and a power supply voltage, scan line driver circuit 55 supplies the power supply voltage to scan line 16.

Each output terminal of output terminal column 18 is connected to each corresponding scan line electrode in scan line electrode column 59 through anisotropic conductive adhesive film 56. The power supply voltage is supplied to each scan line 16 from scan line driver circuit 55 through each output terminal in output terminal column 18.

Each input terminal of scan line driver circuit 55 is electrically connected with FPC cable 8 for connecting an external circuit through an aluminum wiring, a chrome wiring, and/or a copper wiring, etc. The signals such as a control signal, a clock signal, etc. and a power supply voltage supplied from an external circuit are supplied to scan line driver circuit 55 from FPC cable 8 through each input terminal.

As described above, scan line driver element 3 is formed on glass substrate 54 and provided with scan line driver circuit 55 made up of thin film transistors such as polysilicon thin film transistors, wherein scan line driver element 3 is mounted on peripheral rim 1*a* of glass substrate 1 by means of the GOG (glass on glass) mounting process.

Signal line driver element 6 is a TCP (Tape Carrier Package) including: signal line driver circuit 6', which, when receiving signals such as a control signal, a clock signal, etc. and a power supply voltage from an external circuit, supplies the power supply voltage to signal line 17 in response to the above signals; output terminal column 20 in which a plurality of the output terminals of signal line driver circuit 6' are aligned; and an input terminal column (not shown) in which a plurality of the input terminals of signal line driver circuit 6' are aligned. Signal line driver elements 6 are each mounted on film substrates 37 and loaded on peripheral rim 1*b* on the side of glass substrate 1 along signal line electrode column 39 (the side of signal line electrode column 39).

Signal line driver circuit 6' is formed on a silicon substrate and constructed of mono crystal silicon transistors so as to supply a power supply voltage to signal line 17 when receiving the signals such as a control signal and a clock signal, etc. and the power supply voltage from an external circuit.

The output terminals of output terminal column 20 are connected to each of the corresponding electrode terminals, of electrode terminal column 41. Electrode terminals in electrode terminal column 41 are connected to each of the corresponding signal line electrodes in signal line electrode column 39, through anisotropic conductive adhesive film 36. The power supply voltage is supplied to each signal line 17 from signal line driver circuit 6' through each output terminal of output terminal column 20.

Each input terminal of signal line driver circuit 6' is adapted to input the signals and the power supply voltage supplied from an external circuit to signal line driver circuit 6'. For reference, in the present embodiment, the signals and the power supply voltage from an external circuit are supplied to signal line driver circuit 6' through each input terminal from a desired means such as a cable etc. other than FPC cable 8.

A plurality of signal line driver elements 6 are provided, which are mounted on peripheral rim 1b of glass substrate 1 together with FPC cable 8 through adhesion using anisotropic conductive adhesive film 36.

On FPC cable 8 are wired the three-system power supply wiring for feeding scan line driver element 3, the GND wiring, eight control signal lines and a single clock signal line, and further, the power supply wiring for feeding opposed electrodes 32 of the display pixel electrodes of the display panel. In addition, the above described signals and the power supply voltages are supplied to scan line driver element 3 and the display panel through the wirings of FPC cable 8.

Now, it is presumed that: the wiring of FPC cable 8 is a copper wiring 40 μm in wiring width, 80 μm in wiring pitch and 20 μm in wiring thickness; FPC cable 8 is 10 cm in length; and under these conditions, 50 mA current flows through the three-system power supply wiring, the power supply wiring for opposed electrodes 32 and the GND wiring. In these conditions, six or more wirings are required for each power supply wiring in order to constrain the voltage drop in FPC cable 8 to no more than 0.02 V, taking into account the fact that the electric resistivity of a copper wiring is $1.7 \times 10^{-8}$ Ωm. Consequently, the width W7 of FPC cable 8 is 3.12 mm (38×80 μm+2×40 μm) or wider, because the number of the copper wiring lines of FPC cable 8 is 39 or more in total (the number of lines in each of the three-system power supplies for feeding scan line driver element 3 and the GND wiring is 6, the number of control signal lines is 8, the number of the clock signal lines is 1 and the number of lines in the power supply wiring for feeding opposed electrodes is 6).

In this regard, because the width W1 of peripheral rim 1a on the side along scan line electrode column 59 is wider than the width of scan line driver element 3, it attains 4 mm or more. For this reason, even if the width W7 of FPC cable 8 is 3.12 mm, it is possible to mount FPC cable 8 on peripheral rim 1a.

Further, if the length of each signal line electrode of signal line electrode column 39 is 1.5 mm, the width W2 of peripheral rim 1b on the side along signal line electrode column 39 is 1.5 mm or more, because the width W2 is wider than the length of each signal line electrode. In this regard, because signal line driver circuit 6', which constitutes signal line driver element 6 mounted on peripheral rim 1b, is formed on a silicon substrate and made of mono crystal silicon transistors, it is feasible to decrease the width W2 of peripheral rim 1b significantly as compared to conventional devices (nearly 10 mm.)

As described above, the present embodiment offers the advantages that it is feasible to connect FPC cable 8 while keeping the width W1 of peripheral rim 1a of glass substrate 1 mounted with scan line driver element 3, at the same size as that of the conventional device, and that the width W2 of peripheral rim 1b mounted with signal line driver element 4 can be narrowed.

Second Embodiment

Figure 5:
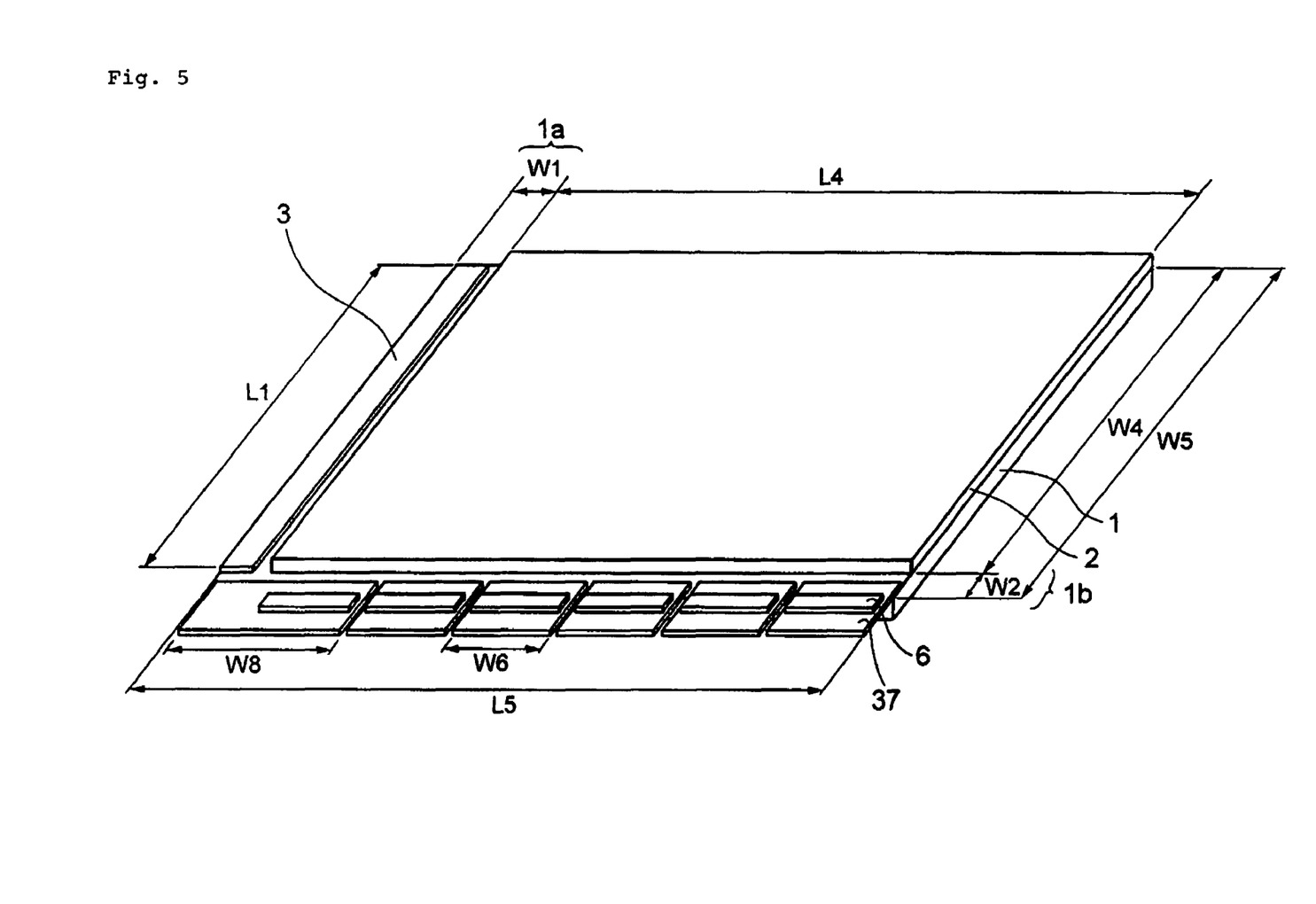
FIG. 5 is a perspective view illustrating the structure of the liquid crystal display device of the second embodiment according to the present invention.

FIG. 5 is a perspective view illustrating the structure of the liquid crystal display device of a second embodiment according to the present invention. For reference, in FIG. 5, constituent elements that are identical to constituent elements in FIG. 3 are assigned the same reference numerals, and redundant explanation of such elements is omitted.

In the present embodiment, the power supply wiring, the GND wiring, the control signal line, and the clock signal line for feeding scan line driver element 3 and the power supply wiring for feeding the opposed electrodes of the display pixel electrodes in the display panel are wired on one or more film substrates 37 (in FIG. 5, one film substrate is represented as width W8) of film substrates 37 mounted with signal line driver elements 6. The above-mentioned signals and power supply voltages are supplied through scan line driver element 3 and the display panel.

Third Embodiment

Figure 6:
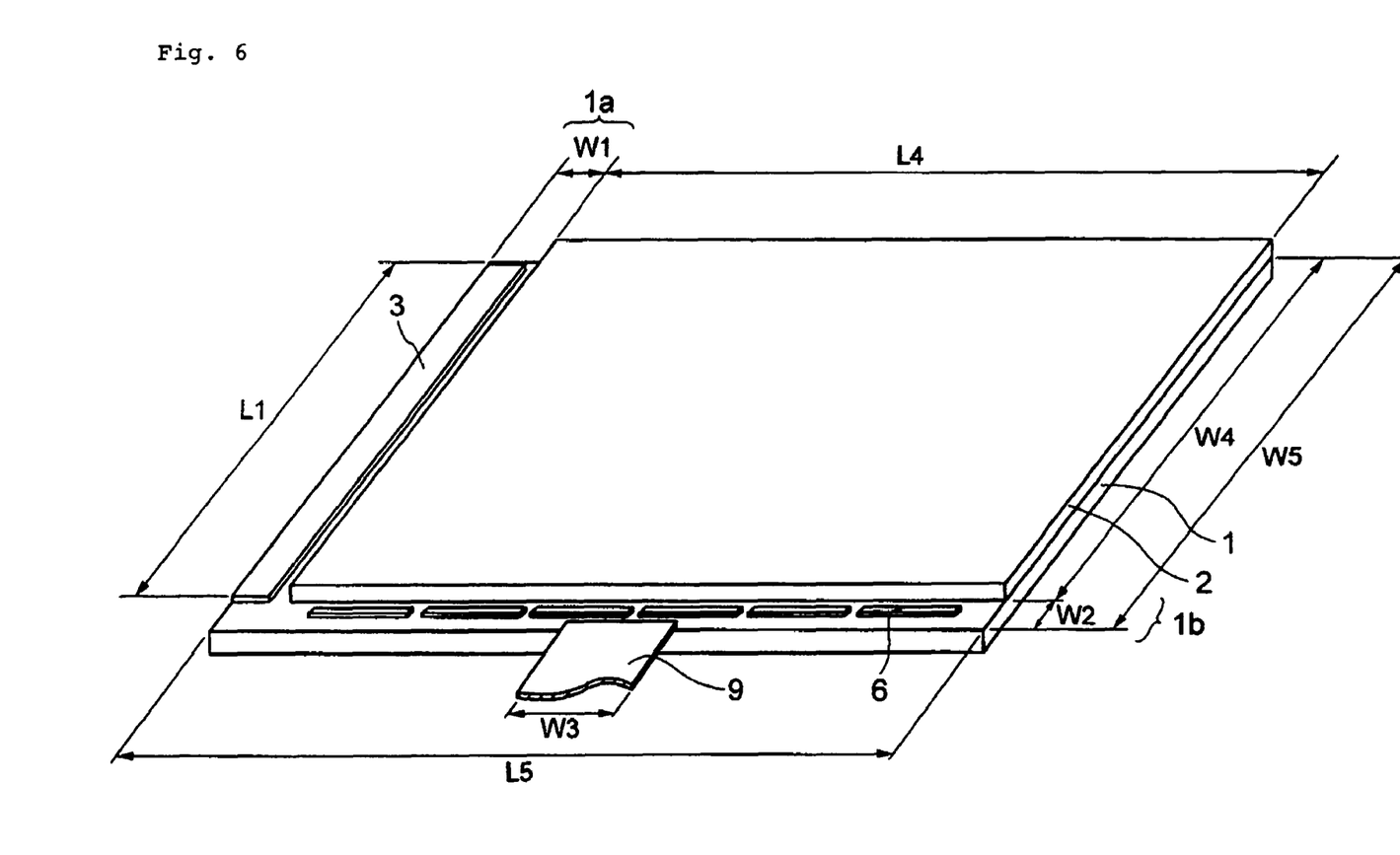
FIG. 6 is a perspective view illustrating the structure of the liquid crystal display device of the third embodiment according to the present invention.

FIG. 6 is a perspective view illustrating the structure of the liquid crystal display device of a third embodiment according to the present invention. For reference, in FIG. 6, constituent elements that are identical to constituent elements in FIG. 3 are assigned the same reference numerals, and redundant explanation of such elements is omitted.

In the present embodiment, signal line driver elements 6 are COG (Chip On Glass)-mounted (mounted through the COG process) directly on peripheral rim 1b on the side of glass panel 1 along the signal line electrode column without interposing the film substrates. In addition, the power supply wiring, the GND wiring, the control signal lines, and the clock signal line for feeding scan line driver element 3 and signal line driver elements 6, and the power supply wiring for feeding the electrodes opposite to the display pixel electrodes in the display panel are mounted on FPC cable 9. Through the wirings formed on FPC cable 9, the above described signals and power supply voltages are supplied to scan line driver element 3, signal line driver elements 6 and the display panel. Further, FPC cable 9 is connected to peripheral rim 1b on the side along the signal line electrode column.

Fourth Embodiment

Figure 7:
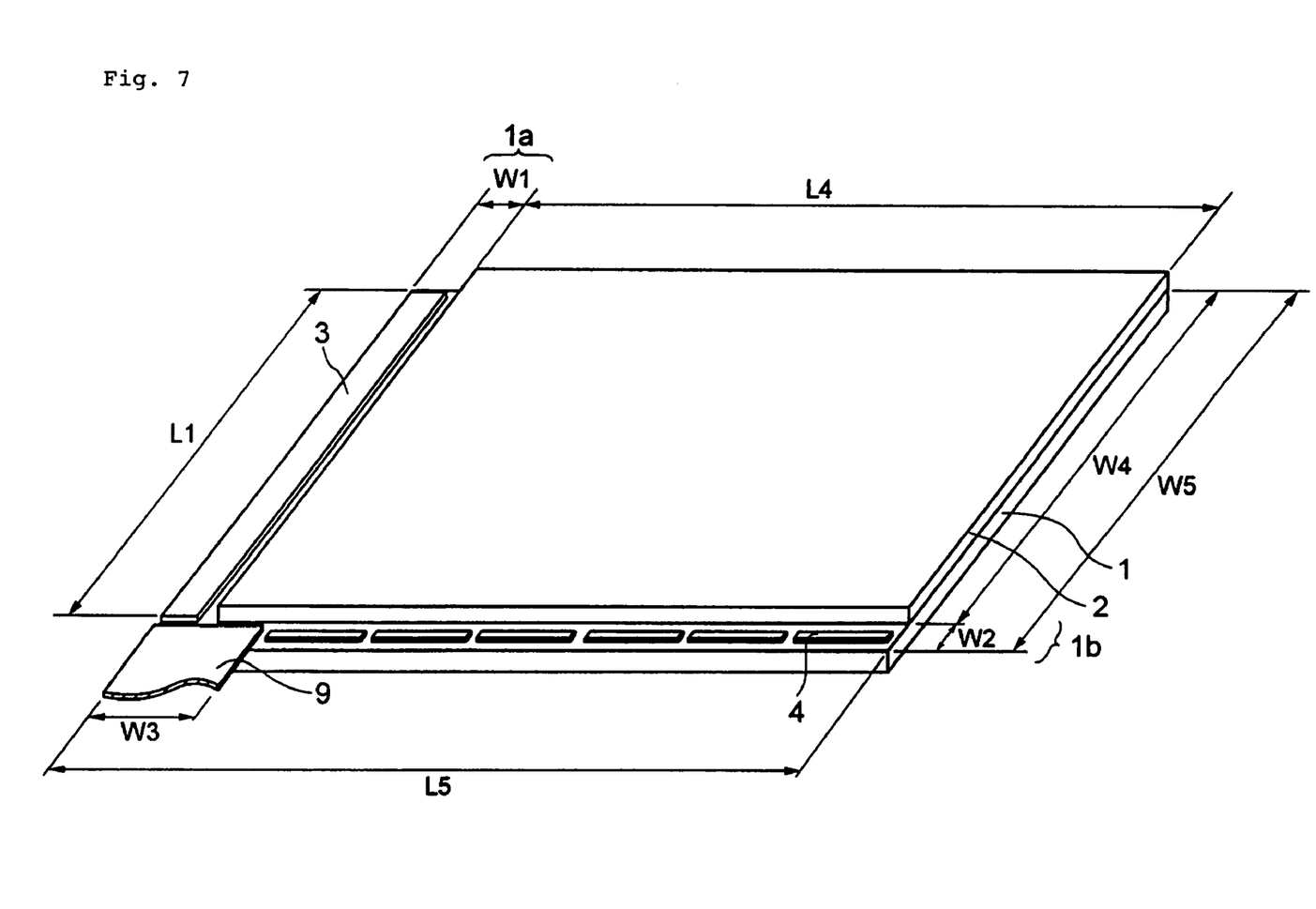
FIG. 7 is a perspective view illustrating the structure of the liquid crystal display device of the fourth embodiment according to the present invention.

FIG. 7 is a perspective view illustrating the structure of the liquid crystal display device of a fourth embodiment according to the present invention. For reference, in FIG. 7, constituent elements that are identical to constituent elements in FIG. 3 are assigned the same reference numerals, and redundant explanation of such elements is omitted.

In the present embodiment, signal line driver elements 6 are COG-mounted directly on peripheral rim 1b on the side of glass panel 1 along the signal line electrode column just like in the third embodiment. Further, the signal lines and power supply wiring for supplying the above described signals and power supply voltages to scan line driver element 3, signal line driver elements 6 and the display panel are mounted on FPC cable 9, and through the wirings formed on FPC cable 9, the above described signals and power supply voltages are supplied to scan line driver element 3, signal line driver elements 6 and the display panel. In this regard, FPC cable 9 is connected to the corner area bounded by peripheral rim 1a disposed along the scan line electrode column and peripheral rim 1b disposed along the signal line electrode column.

For reference, it is a matter of course that the present invention is not limited to the above-described first to fourth embodiments. For example, as an alternative to the liquid crystal display device, the present invention can be applied to another display device such as an organic EL display device etc. Furthermore, an alternative dielectric substrate such as a plastic substrate etc. can be employed in place of the glass substrate, and an organic TFT can be used in place of the silicon thin film transistor (Si-TFT).

While preferred embodiments of the present invention have been described using specific terms, such description is for illustrative purposes only, and it is to be understood that changes and variations may be made without departing from the spirit or scope of the following claims.

What is claimed is:

1. A display device comprising
   a quadrangular display panel having a plurality of display pixels arrayed in a matrix, and a plurality of scan lines and a plurality of signal lines each adapted to select the plurality of the display pixels,
   a scan line driver element, having a scan line driver circuit formed on a dielectric substrate and made up of thin film transistors and adapted to receive signals and a power supply voltage from an external circuit and supply said power supply voltage to said scan lines in response to the supplied signals, wherein said scan line driver element is mounted on a peripheral rim along one side of said display panel outside the display pixel region,
   a signal line driver element, having a signal line driver circuit made up of mono crystal silicon transistors and adapted to receive signals and a power supply voltage from said external circuit and supply said power supply voltage to said signal lines in response to the supplied signals, wherein said signal line driver element is mounted on the peripheral rim along another side adjoining said one side of said display panel outside the display pixel region in an arrangement in which said signal line driver element is mounted on a film substrate, and
   FPC cable in which wirings are formed to supply said signals and power supply voltage from said external circuit to said scan line driver element and said display panel and adapted to supply signals and the power supply voltage to said scan line driver element and said display panel through said wirings.

2. A display device according to claim 1, wherein said dielectric substrate is a glass substrate.

3. A display device according to claim 1, wherein said film substrate has wirings formed to supply said signals and power supply voltage from said external circuit to said scan line driver element and said display panel, and wherein said signals and power supply voltage are supplied to said scan line driver element and said display panel through the wirings formed on said film substrate in place of said FPC cable.

4. A display device according to claim 1, wherein said signal line driver element is mounted on the peripheral rim along said another side of said display panel outside said display pixel region directly without interposing said film substrate, and
   said FPC cable has wirings additionally formed for supplying signals and a power supply voltage from said external circuit to said signal line driver element and supplies said signals and power supply voltage to said signal line driver element through said additionally formed wirings.

5. A display device according to claim 4, wherein said FPC cable is provided in the corner region bounded by said scan line driver element and said signal line driver element.

6. A display device according to claim 1, wherein said display panel is provided with a quadrangular first glass substrate on which said display pixels, said scan lines and said signal lines are formed and also a quadrangular second glass substrate opposite to said first glass substrate across the liquid crystal layer and having opposed electrodes formed thereon, and
   said first glass substrate is larger in both length and width than said second glass substrate, with an area covered with said second glass substrate serving for said display pixel region and also an area outside the area covered with said second glass substrate defined as said peripheral rim.

* * * * *